(12) United States Patent
Akiyama (10) Patent No.: US 8,629,822 B2
(45) Date of Patent: Jan. 14, 2014

(54) FIELD SEQUENTIAL COLOR DISPLAY DEVICE WITH RED, GREEN, BLUE AND WHITE LIGHT SOURCES

(75) Inventor: Takashi Akiyama, Sayama (JP)

(73) Assignee: Citizen Holdings Co., Ltd., Tokyo (JP)

( * ) Notice: Subject to any disclaimer, the term of this patent is extended or adjusted under 35 U.S.C. 154(b) by 1250 days.

(21) Appl. No.: 11/808,798

(22) Filed: Jun. 13, 2007

(65) Prior Publication Data

US 2008/0002101 A1 Jan. 3, 2008

(30) Foreign Application Priority Data

Jun. 13, 2006 (JP) ................................. 2006-163866

(51) Int. Cl.
*G09G 3/36* (2006.01)
*G02F 1/1335* (2006.01)

(52) U.S. Cl.
USPC .................. 345/88; 345/99; 345/102; 349/61

(58) Field of Classification Search
USPC ................................. 345/87–104; 349/47–90
See application file for complete search history.

(56) References Cited

U.S. PATENT DOCUMENTS

| | | | |
|---|---|---|---|
| 2002/0109821 A1* | 8/2002 | Huibers et al. | 353/84 |
| 2003/0197674 A1* | 10/2003 | Herrmann | 345/102 |
| 2004/0036668 A1* | 2/2004 | Nakanishi | 345/88 |
| 2006/0126021 A1* | 6/2006 | Vanlier et al. | 353/31 |
| 2006/0256257 A1* | 11/2006 | Nakano et al. | 349/80 |
| 2007/0064422 A1* | 3/2007 | Murai | 362/231 |

FOREIGN PATENT DOCUMENTS

| | | |
|---|---|---|
| JP | H05-19257 A | 1/1993 |
| JP | 2001-174780 | 6/2001 |
| JP | 2002072980 A | 3/2002 |
| JP | 2004004626 A | 1/2004 |
| JP | 2004-046140 | 2/2004 |
| JP | 2004-333576 | 11/2004 |
| JP | 2006-053350 | 2/2006 |

OTHER PUBLICATIONS

Official Communication from Japanese Patent Office in counterpart Japanese Patent Application No. 2006-163866, mailed Dec. 13, 2011 (5 pages).

* cited by examiner

*Primary Examiner* — Bipin Shalwala
*Assistant Examiner* — Keith Crawley
(74) *Attorney, Agent, or Firm* — Finnegan, Henderson, Farabow, Garrett & Dunner, L.L.P.

(57) ABSTRACT

An highly bright and energy efficient FSC color liquid crystal display device incorporating a white light source is provided. The FSC color display device includes a first light source for emitting a light having a plurality of colors, a second light source for emitting a white light, and a light source controller for displaying a color image so as to control the first light source to repeat, in a predetermined cycle, sequentially making a selection from the plurality of color light sources to cause the selected color light source to emit a light, and to control the second light source so that the second light source emits a white light concurrently with light emission from the first light source.

4 Claims, 11 Drawing Sheets

FIELD SEQUENTIAL COLOR DISPLAY DEVICE WITH RED, GREEN, BLUE AND WHITE LIGHT SOURCES

This application is a new U.S. Patent Application that claims benefit of Japanese Patent Application No. 2006-163,866, filed on Jun. 13, 2006, the entire content of the Japanese Patent Application No. 2006-163,866 is hereby incorporated by reference.

FIELD OF THE INVENTION

The present invention relates to a color display device, and more particularly to a color display device employing a field sequential color system (hereinafter abbreviated "FSC"), which produces a color display by rapidly switching between a plurality of light sources having different emission wavelengths.

BACKGROUND OF THE INVENTION

An FSC color liquid crystal display device incorporates three light sources of red, green, and blue (hereinafter abbreviated "R," "B," and "B," respectively) which differ in wavelength, and forces the three light sources to emit lights of frequencies of 60 Hz or higher sequentially. Further, an FSC color liquid crystal display device applies a drive voltage to a liquid crystal in synchronization with the timing of light emission of each of its light sources thereby producing a color display (e.g. Patent Document 1).

To prevent color break-up due to R, G and B colors which arises in an FSC color display device, there has been known a method of producing a color display by making four light sources of R, G and B colors, and white color (hereinafter abbreviated "W color") emit lights sequentially (e.g. Patent Document 2). Color break-up refers to a phenomenon in that e.g. a point on an edge of a W color display shifts, leading to interference with R, G, and B colors in that portion, and thus the portion seems to have a color that is different from a desired color. This is attributable to the movement of the human eye, such as tracking in which the human eye tracks a moving object on a screen. In other words, the color break-up refers to a phenomenon in that R, G and B color images are slightly shifted by time differences when a scene such as a white object moving on a screen is displayed with R, G, and B colors, whereby an edge of the white object ends up being a color different from a desired color.

Figure 11:
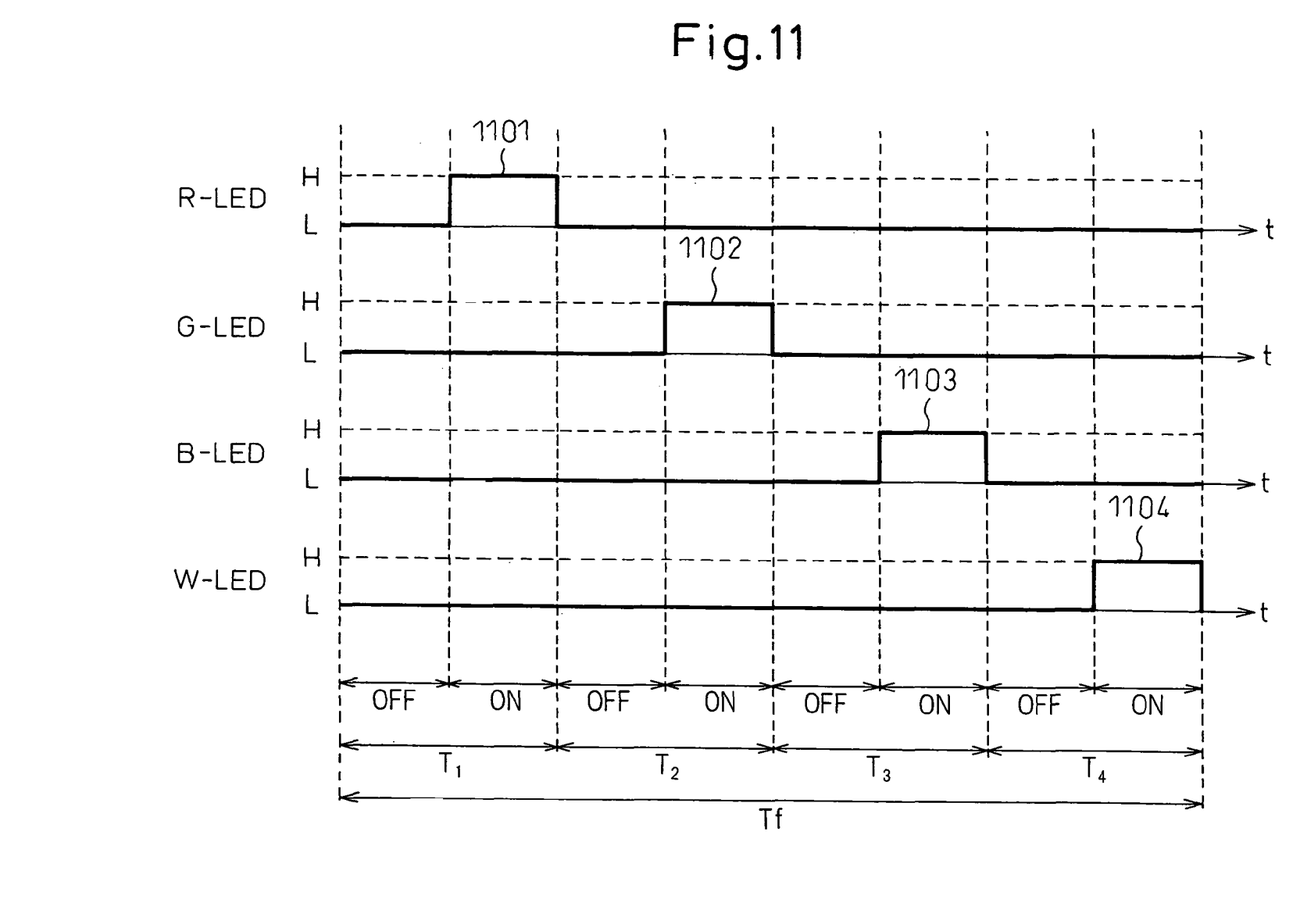
FIG. 11 is a drawing showing an example of a group of timing charts for a conventional color display device.

As for an FSC color display device, a method of producing a color display by forcing four light sources of R, G, B and W to light independently has been known (e.g. Patent Document 3). FIG. 11 is a drawing showing an example of a group of timing charts in association with such method, in which a lighting control signal 1101 coming from an R-LED, a lighting control signal 1102 from a G-LED, a lighting control signal 1103 from a B-LED, and a lighting control signal 1104 from a W-LED are shown. It is noted for the control signals that "H" level represents that each color LED is in its lighting mode, and "L" level represents that the color LED stays in its unlit mode. As shown in FIG. 11, the R-LED is turned on in the first subfield (period $T_1$) of a field (period Tf), the G-LED is turned on in the second subfield (period $T_2$), the B-LED is turned on in the third subfield (period $T_3$), and the W-LED is turned on in the fourth subfield (period $T_4$).

Patent Document 1: Japanese Unexamined Patent Publication No. H05-19257
Patent Document 2: Japanese Unexamined Patent Publication No. 2002-72980 (FIG. 8)
Patent Document 3: Japanese Unexamined Patent Publication No. 2004-4626 (FIG. 1)

SUMMARY OF THE INVENTION

The brightness of an FSC color display device depends on the amount of light of each color light source and visibility. Therefore, to raise the brightness of an FSC color liquid crystal display device, it is necessary to increase the amount of light of each color light source. For that purpose, a large amount of electric power is needed. In contrast, in the case where an FSC color display device is utilized for a portable electronic appliance, it is necessary to suppress power consumption. Hence, a high-brightness and energy efficient FSC color liquid crystal display device is desired.

With an FSC color display device which turns on four light sources of R, G, B and W colors in four subfields independently to display color, a liquid crystal with a high response speed is required. Further, there is a disadvantage in that turning on the light source of W color, an operation to extract the data for W color from image data needs to be executed, and an operation circuit for this operation is necessary.

In addition, a color display device is not always required to perform color display. For example, when a character, but not a picture is displayed, priority can be put on power saving to produce a monochrome display. However, as for a conventional FSC color display device, power consumption being decreased while a monochrome display is produced has not been proposed.

Therefore, it is an object of the invention to provide a highly-bright and energy efficient FSC color display device by use of a light source of W color.

Also, it is an object of the invention to provide an FSC color display device which can produce a monochrome display with lower power consumption by use of a light source of W color.

A color display device of the present invention includes a first light source for emitting light having a plurality of colors, a second light source for emitting white light, and a light source controller for displaying a color image so as to control the repeat of the first light source, in a predetermined cycle, sequentially making a selection from the plurality of colors of the first light source to cause the first light source to emit the selected color of light, and to control the second light source so that the second light source emits white light concurrently with light emission from the first light source.

As for the color display device of the present invention, it is preferable that the light source controller displays a monochrome image so that light emission by the first light source is stopped, and only white light emission by the second light source is performed. In this case, the color display device is arranged so that a monochrome display can be produced by use of only the white light.

Further, with the color display device of the present invention, it is preferable to have a receiver for receiving a signal for switching between a first mode for displaying the color image and a second mode for displaying the monochrome image. In this case, the color display device is arranged so that the color display mode and the monochrome display mode can be switched in response to the switching signal.

Still further, for the color display device of the present invention, it is preferable that the light source controller controls the brightness of white light emission so as to fit in a visibility of a colored light emitted from the first light source, which emits a light in a predetermined cycle, whereby a monochrome image is displayed. This enables display of a monochrome image having a gray scale equivalent to a color scale of a color image.

In addition, with the color display device of the present invention, it is preferable that the light source controller controls a ratio between ON and OFF periods of the first and second light sources.

Also, a color display device of the present invention includes a liquid crystal panel, an R-color light source for emitting a red light, a G-color light source for emitting a green light and a B-color light source for emitting a blue light, a W-color light source for emitting a white light, a light guiding means for illuminating the liquid crystal panel with lights emitted by the R-color, G-color, B-color and W-color light sources, and a light source controller for displaying a color image so as to repeat, in a predetermined cycle, sequentially making a selection from the R-color, G-color and B-color light sources to cause the selected light source to emit a light, and to control the W-color light source so that the W-color light source emits a light concurrently with light emission from the selected color light source.

As for the color display device of the present invention, it is preferable that the light source controller displays a monochrome image so that light emissions by the R-color, G-color and B-color light sources are stopped, and only the W-color light source emits a light. In this case, the color display device is arranged so that monochrome display can be performed by use of only the white color light.

Further, with the color display device of the present invention, it is preferable to have a receiver for receiving a signal for switching between a first mode for displaying the color image and a second mode for displaying the monochrome image. In this case, the color display device is arranged so that the color display mode and the monochrome display mode can be switched in response to the switching signal.

Still further, for the color display device of the present invention, it is preferable that the light source controller controls the brightness of white light emission so as to fit in a visibility of each color of light emitted from the R-color, G-color, and B-color light source, which emit a light in a predetermined cycle, whereby a monochrome image is displayed. This enables display of a monochrome image having a gray scale equivalent to a color scale of a color image.

In addition, with the color display device of the present invention, it is preferable that the light source controller controls a ratio between ON and OFF period of R-color, G-color, B-color, and W-color light source.

In accordance with the present invention, a W-color light source with a good light emission efficiency is used, which makes it possible to provide a highly bright and energy efficient FSC color display device.

Also, in accordance with the present invention, only a white color light source having good light emission efficiency is used in producing a monochrome display, and therefore it is possible to provide an FSC color display device which can produce a monochrome display with lower power consumption.

Further, in accordance with the present invention, in the case where only the white color light source is used in consideration of visibility, it is possible to display a monochrome image having a gray scale equivalent to a color scale of a color display image.

Still further, in accordance with the present invention, adjustment of each color can be performed by turning on the white color light source concurrently with the other color light sources, and therefore it is possible to adjust chromaticity as a whole.

Furthermore, in accordance with the present invention, it is possible to use a white color light source without the need for a liquid crystal capable of responding at a specially high speed or a special operation circuit for creating data for white color.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

A color display device in accordance with the invention will be described below with reference to the drawings. It should be understood that a color display device in accordance with the invention is not limited to the description below, and can take various forms within the scope of the art of the invention.

Figure 1:
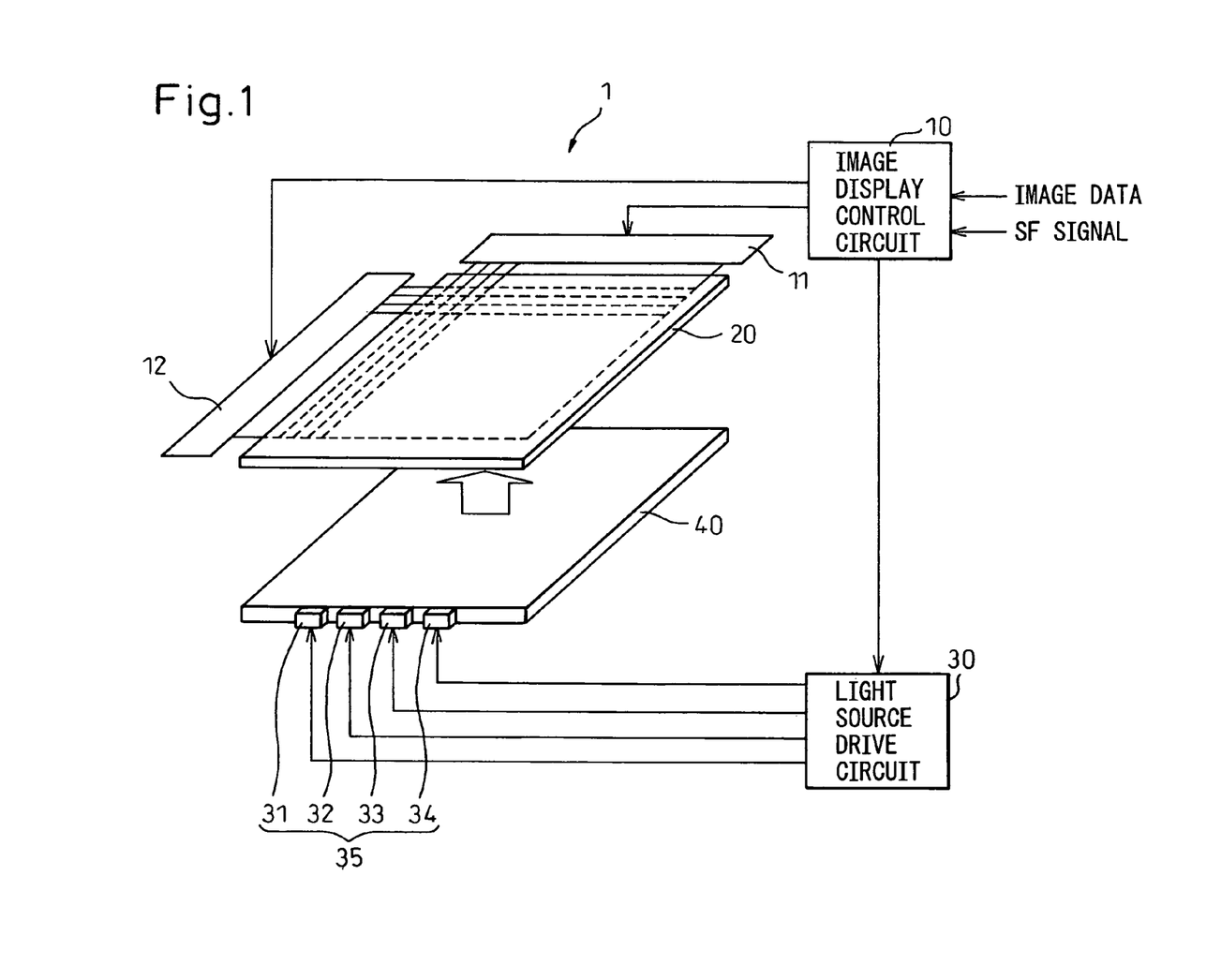
FIG. 1 is a schematic diagram of a color display device 1 in accordance with the present invention.

FIG. 1 is a schematic diagram of a color display device 1 in accordance with the present invention.

As shown in FIG. 1, the color display device 1 includes an image display control circuit 10, a source driver 11, a gate driver 12, a TFT type liquid crystal panel 20 which is driven with active elements, a light source drive circuit 30, a light source section 35 composed of an R-LED 31 as a light source, a G-LED 32 as a light source, a B-LED 33 as a light source, and a W-LED 34 as a light source; and a light guiding plate 40. The R-LED 31, G-LED 32, B-LED 33, and W-LED 34 are laid out on a side face of the light guiding plate 40. Color light emitted by each color LED is subjected to diffusion, the bend of its optical path and conversion into a substantially uniform parallel light by the light guiding plate 40, by which the liquid crystal panel 20 is generally illuminated. It should be noted that two ox more R-LEDs 31 may be laid out, which also applies to the cases of the G-LED 32, B-LED 33, and W-LED 34, and the number of LEDs does not have to be common among the different color LEDs.

The image display control circuit 10 controls the source driver 11 and the gate driver 12 in accordance with image data input from e.g. a general control CPU of a main body (not shown) of a mobile phone, etc., to which the color display device 1 is connected, and controls the amount of light transmission of each pixel of a liquid crystal panel 20 (of e.g. 2.4 in., QVGA size, and 320×240 pixels). Also, the image display control circuit 10 switches between a color display mode and a monochrome display mode in response to a SF signal which is input from a main body of the device 1. In addition, the image display control circuit 10 sends the light source drive circuit 30 a timing signal for synchronism with the light source. In other words, the image display control circuit 10 also serves as a receiver for the SF signal.

In this embodiment, the liquid crystal panel 20 holds liquid crystal molecules between two transparent substrates. As such liquid crystal is used e.g. Twisted Nematic liquid crystal (TN liquid crystal) which swivels light traveling therethrough by 90 degrees. On the side of one transparent substrate, a TFT device is disposed for each pixel, the source line of which is connected with the source driver 11, and the gate line is connected with the gate driver 12. It should be noted that e.g. a STN liquid crystal, ferroelectric liquid crystal, and anti-ferroelectric liquid crystal can be used instead of a TN liquid crystal in a color display device in accordance with the invention, and in such case, an effect similar to the effect produced by this embodiment can be expected.

The light source drive circuit 30 turns on the R-LED 31, G-LED 32, B-LED 33, and W-LED 34 sequentially with a timing to be described later in accordance with timing signals from the image display control circuit 10 thereby to illuminate the liquid crystal panel 20 with the color lights through the light guiding plate 40.

Figure 2:
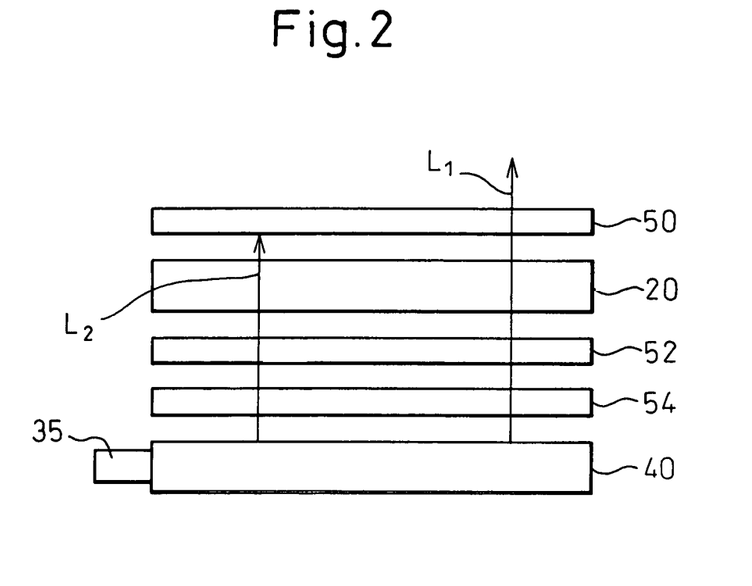
FIG. 2 is a schematic sectional view of the color display device 1 in accordance with the present invention.

FIG. 2 is a schematic sectional view of the color display device 1 in accordance with the present invention.

In the color display device 1, a first polarizer 50, the liquid crystal panel 20, a second polarizer 52, a semitransparent reflecting plate 54, and the light guiding plate 40 are disposed when viewed from the viewer side (from the top of the drawing sheet). The first polarizer 50 and second polarizer 52 are set to a normally white mode. The reference characters $L_1$ and $L_2$ represent illumination lights which are emitted by the light source section 35, enter the light guiding plate 40, and then are released from the light guiding plate 40.

The light released from the light guiding plate 40 passes through the liquid crystal panel 20 and becomes visually recognizable ($L_1$), and therefore the pixels are visually recognized through the color lights corresponding to the light sources when the pixels of the liquid crystal panel 20 are set to a transmission mode. In contrast, when the pixels of the liquid crystal panel are set to a non-transmission mode, the light released from the light guiding plate 40 ($L_2$) cannot pass through the first polarizer 50, and therefore the pixels are recognized in the form of black display visually.

As for an FSC color display device, the subfield is switched rapidly exceeding the recognizable limitations of the human eye, and LEDs of the colors are turned on and off repeatedly at a high speed (e.g. 60 Hz or higher). Therefore, R, G, B images are integrated (i.e. lights of three colors, R, G and B are mixed) into a multicolor display, which will be visually recognized by the human eye. In a color display device in accordance with the invention, the W-LED 34 emits light in synchronization with sequential light emissions by the R-LED 31, G-LED 32 and B-LED 33, in which light emission by the W-LED 34 occurs concurrently with or in synchronization with any of emissions by the color LEDs. However, the color display device in accordance with the invention is similar to a conventional FSC color display device in that lights of three colors of R, G and B are mixed and the resultant image will be visually recognized as a multicolor display.

Figure 3:
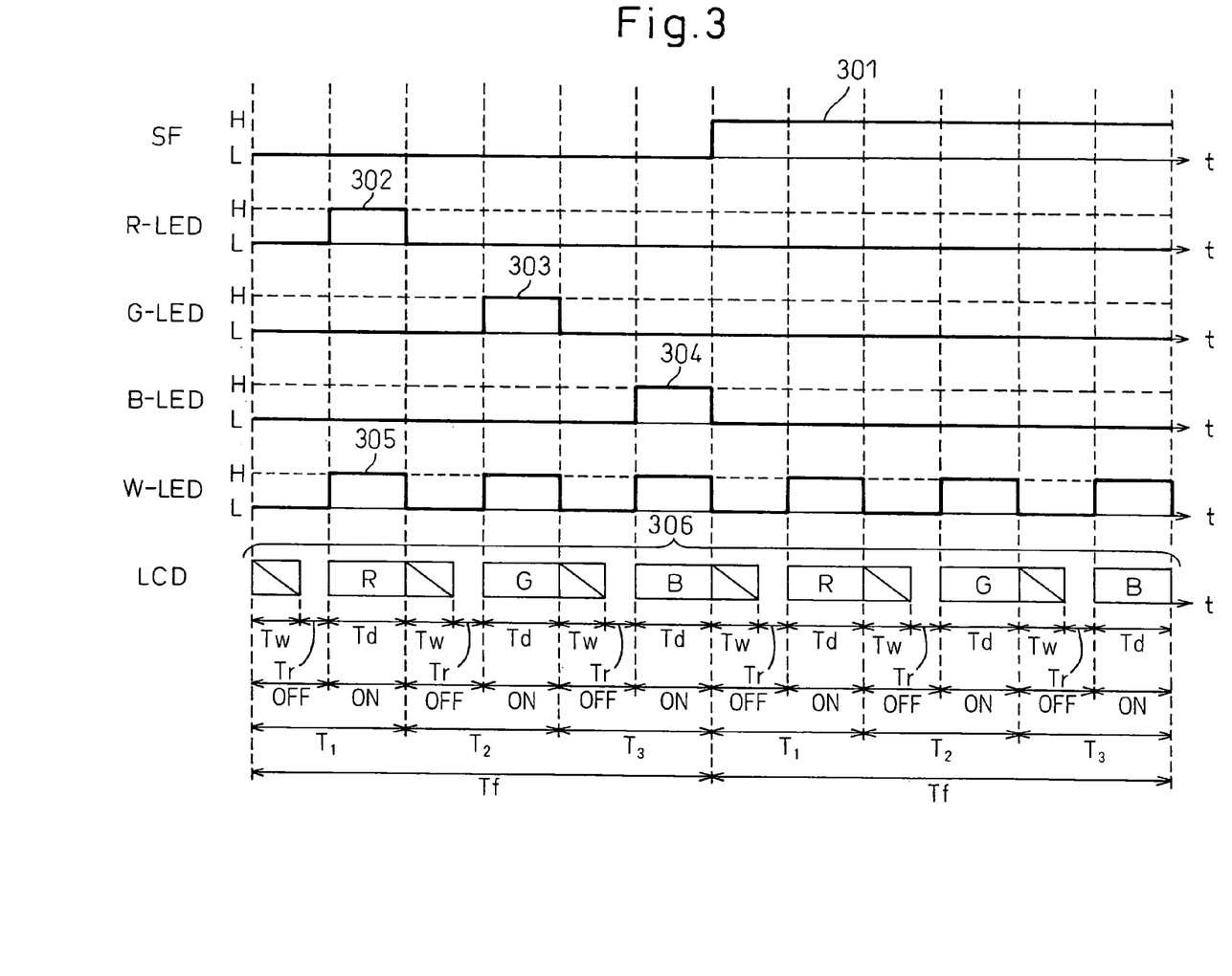
FIG. 3 is a drawing showing an example of a group of timing charts for the color display device 1 in accordance with the present invention.

FIG. 3 is a drawing showing an example of a group of timing charts for the color display device 1 in accordance with the present invention.

In regard to an SF signal 301 (i.e. a signal for switching between the color display mode and the monochrome display mode) shown in FIG. 3, "H" level represents the monochrome display mode, and "L" level represents the color display mode. As described above, the SF signal 301 is a control signal, which the color display device 1 receives from a main body control CPU of a mobile phone connected with the color display device and the like.

Also, a lighting control signal 302 for the R-LED 31, and a lighting control signal 303 for the G-LED 32, and a lighting control signal 304 for the B-LED 33, and a lighting control signal 305 for the W-LED 34 are shown in FIG. 3. In regard to the lighting control signal for each color, "H" level represents a lighting mode of the color LED, and "L" level represents an unlit mode of the color LED.

Further, states 306 of the liquid crystal panel 20 in its writing period Tw, response period Tr, and image display period Td are shown in FIG. 3. The writing period Tw is a period of time during which voltages depending on pixel data are supplied while the pixels of the liquid crystal panel 20 are scanned sequentially. The response period Tr is a period of time which has elapsed until the pixels of the liquid crystal panel 20 respond to the transmittances corresponding to supplied voltages. The image display period Td is a period of time during which the transmittance adjusted in accordance with the voltage applied into the pixel is performed is maintained, and a desired image is displayed.

As for the control in accordance with the timing chart shown in FIG. 3, the image display control circuit 10 performs the control of each pixel of the liquid crystal panel 20 based on the received image data, whereas the light source control circuit 30 performs the control of the color LEDs 31 to 34 based on a timing signal, etc. from the image display control circuit 10.

One field (Period Tf) in the color display mode of the color display device 1 (SF is at L level) consists of a first subfield (Period $T_1$) during which the R-LED 31 and the W-LED 34 are turned on concurrently, a second subfield (Period $T_2$) during which the G-LED 32 and the W-LED 34 are turned on concurrently, and a third subfield (Period $T_3$) during which the B-LED 33 and the W-LED 34 are turned on concurrently. With the color display device 1, the field frequency (1/Tf) is set to 100 Hz. Lighting of each color LED is controlled so that its ON time or ON period vs. OFF period ratio is controlled corresponding to the image display period Td of the liquid crystal panel 20 (see the state 306, and the lighting control signals 302 to 305 of the individual colors shown in FIG. 3).

In each subfield, the W-LED and one of the R-LED, G-LED and B-LED are turned on. Therefore, an image in one color of R, G and B colors is displayed on the viewer side of the liquid crystal panel 20. However, as the subfield is switched rapidly exceeding the recognizable limitations of the human eye, a multicolor image resulting from integration of R, G and B color images is visually recognized by the human eye.

In the monochrome display mode of the color display device 1 (SF is at H level), one field (Period Tf) consists of a first subfield (Period $T_1$), a second subfield (Period $T_2$), and a third subfield (Period $T_3$) In the first to third subfields, the W-LED 34 is turned on. The periods of the subfields in the monochrome display mode are the same as those in the color display mode. In the monochrome display mode, the k-LED 31, G-LED 32 and B-LED 33 are not turned on, and only the W-LED 34 is switched on.

In each subfield the W-LED goes on instead of the R-LED, G-LED, and B-LED, and therefore a monochrome image in white and black colors is displayed on the viewer side of the liquid crystal panel 20.

Figure 4:
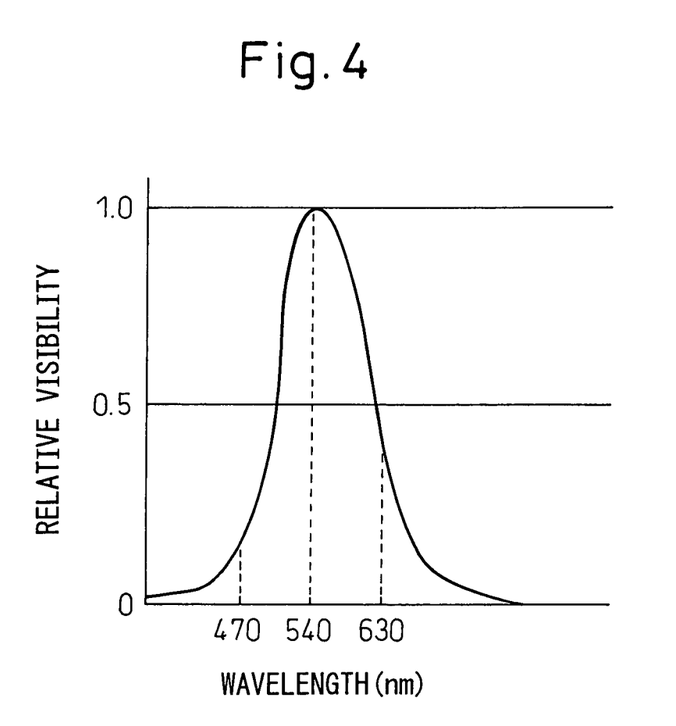
FIG. 4 is a graph showing relative visibility characteristics of the human eye.

FIG. 4 is a graph showing relative visibility characteristics of the human eye.

In FIG. 4, the vertical axis shows the relative visibility of the human eye; the horizontal axis shows a wavelength. In this example, the R-LED 31 has a wavelength of 630 nm, the G-LED 32 has a wavelength of 540 nm, and the R-LED 33 has a wavelength of 470 nm. In the case where the color LEDs stay ON at a common light emission energy, when someone sees the individual colors, G color appears the most brightly, and thereafter the degree of brightness lowers in the order of R color and B color. As shown in FIG. 4, when the visibility of G color is 1.0, the visibility of R color is about 0.4, and that of B color is about 0.2.

Figure 5:
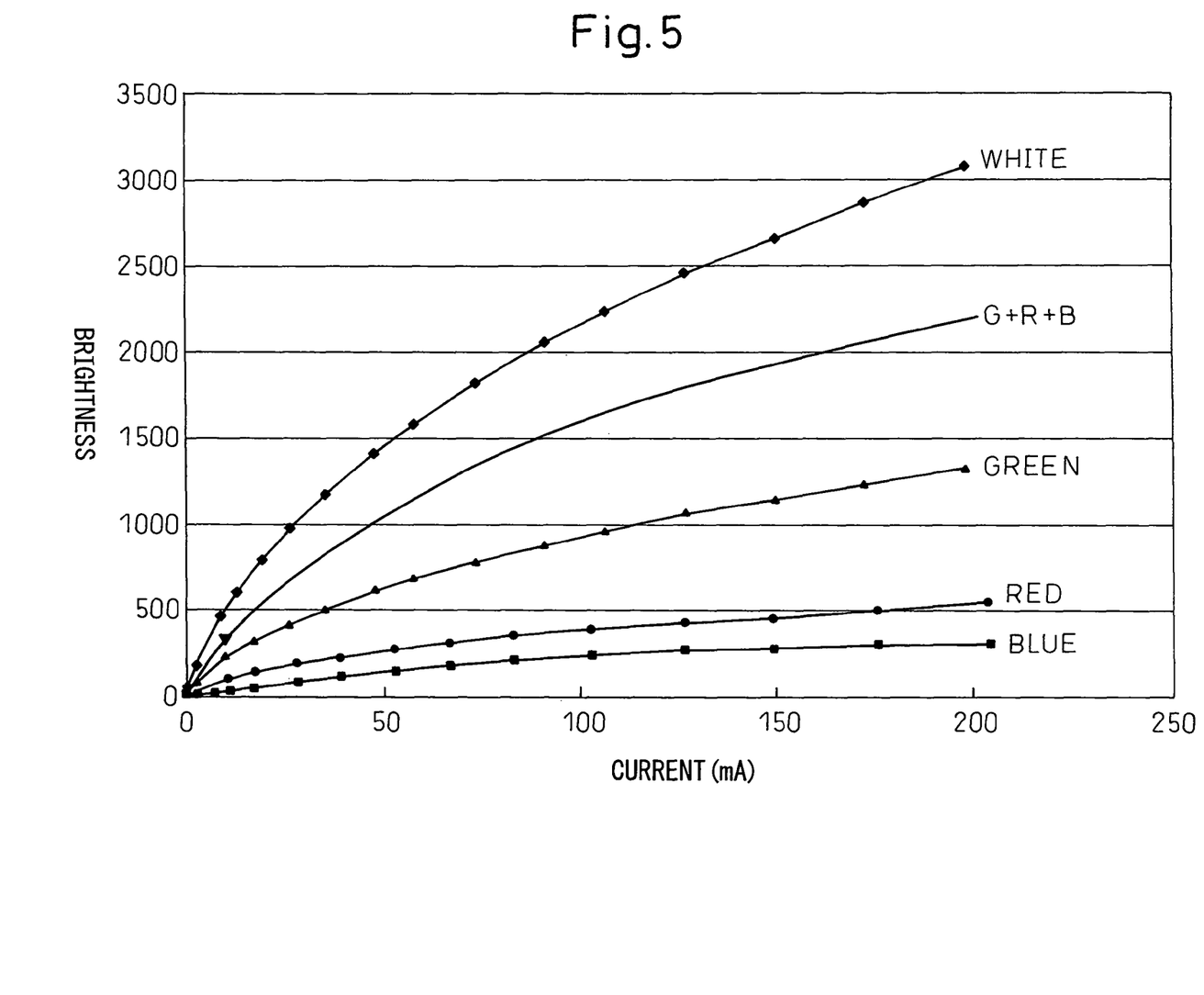
FIG. 5 is a graph showing the relationship between the brightness of each color LED and an applied current.

FIG. 5 is a graph showing the relationship between the brightness of each color LED and an applied current.

As shown in FIG. 5, in the case where the same current (mA) is applied to the LEDs, among the R-LED 31, G-LED 32 and B-LED 33, the G-LED 32 is the highest in brightness, and thereafter the brightness lowers in the order of the R-LED 31 and B-LED 33. However, the brightness of the W-LED 34 is higher than the sum of the brightness of the R-LED 31, G-LED 32 and B-LED 33. Now, it is noted that the brightness includes a factor of the visibility which has been described with reference to FIG. 4.

FIGS. 6A to 6D are drawings showing examples of brightnesses of the respective colors in the color display mode and the monochrome display mode.

Figure 6A:
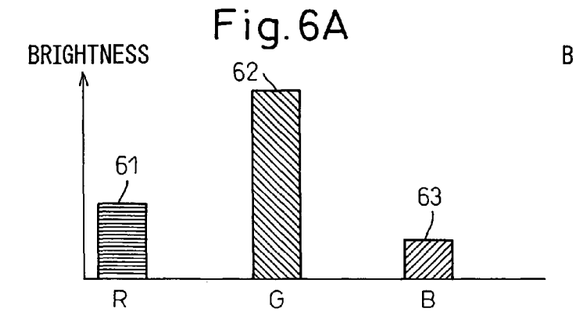
FIG. 6A is a view showing the case of using only an R-LED, a G-LED and a B-LED for backlight of the liquid crystal panel 20.

FIG. 6A shows an example of the brightness distribution of the color lights when only three conventional LEDs of R, G and B colors are used for the backlight of the liquid crystal panel 20.

Specifically, the following actions are performed in the case shown in FIG. 6A: turning on the R-LED, and adjusting predetermined pixels of the liquid crystal panel in transmittance, thereby to make the brightness of R 61; turning on the G-LED, and adjusting predetermined pixels of the liquid crystal panel in transmittance, thereby to make the brightness of G 62; and turning on the B-LED, and adjusting predetermined pixels of the liquid crystal panel in transmittance, thereby to make the brightness of B 63. As stated above, the brightness contains the visibility of the human eye as a factor. The applied currents for adjustment of the brightness of the color LEDs can be determined with reference to FIG. 5. Incidentally, in the case shown by FIG. 6A, the same current is applied to the color LEDs.

Figure 6B:
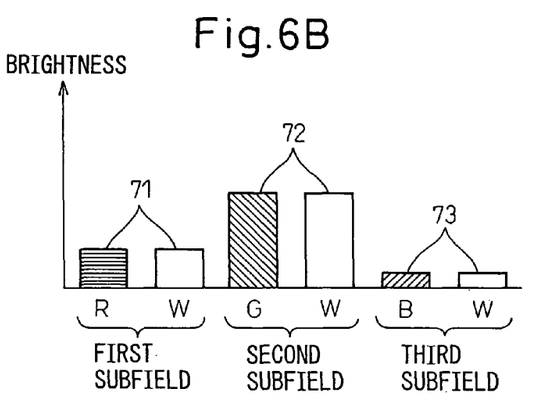
FIG. 6B is a view showing the case of performing control so that the brightness of each color in the case of FIG. 6A is replaced with the brightness achieved by concurrent lighting of the W-LED 34 with one of the R-LED 31, G-LED 32 and B-LED 33.

FIG. 6B shows an example of the brightness distribution of the color lights, which are released from predetermined pixels of the liquid crystal panel 20 in the color display mode of the color display device 1 in accordance with the invention.

Specifically, in the case of FIG. 6B, the following actions are performed in the first subfield (see the state 306 in FIG. 3): turning on the R-LED 31 and the W-LED 34 concurrently, and adjusting predetermined pixels of the liquid crystal panel in transmittance, thereby to make the brightness of R and W 71. In the second subfield (see the state 306 in FIG. 3), the following actions are performed: turning on the G-LED 32 and the W-LED 34 concurrently, and adjusting predetermined pixels of the liquid crystal panel in transmittance, thereby to make the brightness of G and W 72. In the third subfield (see the state 306 in FIG. 3), the following actions are performed: turning on the B-LED 33 and the W-LED 34 concurrently, and adjusting predetermined pixels of the liquid crystal panel in transmittance, thereby to make the brightness of B and W 73.

In the case shown by FIG. 6B, control is exercised so that the brightness of each color in the case of FIG. 6A is replaced with the brightness achieved by concurrent lighting of one of the R-LED 31, G-LED 32 and B-LED 33, and the W-LED 34. Therefore, the total brightness in the case of FIG. 6B is the same as that achieved in the case of FIG. 6A. Further, as the visibility is taken into account in the case of FIG. 6B, the brightness is unchanged to the human eye even with different the colors in comparison to the case of FIG. 6A. However, in the case of FIG. 6B, the W-LED 34 has a higher light emission efficiency in comparison to the other color LEDs, and therefore it needs a lower power consumption to achieve the same brightness. Hence, with the color display device 1 in accordance with the invention, the power consumption can be suppressed, although the same brightness is achieved. The change in presentation color by concurrent light emission with the W-LED 34 is to be described later.

In the case of FIG. 6B, the brightness of each color of R, G and B, which has been achieved in the case of FIG. 6A, is allocated to the W-LED and the LED of the color so that the brightness of the color is made one half of that in the case of FIG. 6A. However, the ratio is a mere example, the invention is not limited. It is possible to set a suitable ratio in accordance to use or performance of a display device.

Also, in the case of FIG. 6B, the color display device 1 is arranged so that the same brightness as that obtained in the case of FIG. 6A is achieved. As a result, the power consumption required for producing the brightness identical to the brightness which the W-LED 34 bears is smaller than the electric power consumed by the R-LED 31, the G-LED 32, or the B-LED 33 to achieve the same brightness, and therefore control such that the total power consumption is suppressed ends up being performed. However, it is also possible to perform same way as that in the case of FIG. 6A to use the additional brightness produced by the W-LED 34 as it is. In other words, the invention can provide a display device which can achieve higher brightness when it is assumed that the device consumes the same electric power as conventional one.

Further, in the case of FIG. 6B, all the color LEDs stay in ON during the image display period Td, and brightness is adjusted by the values of the currents of the color LEDs. However, the brightness of the respective colors can be adjusted by controlling the light emission time of each color LED.

In the above example, the color display device is controlled so that the W-LED 34 is turned on concurrently with the time when the R-LED 31, the G-LED 32, and the B-LED 33 are turned on. However, the W-LED 34 is not necessarily turned on concurrently with lighting of all the R-LED 31, the G-LED 32, and the B-LED 33. The color display device may be controlled so that the W-LED 34 is turned on concurrently with the lighting of one or two of the R-LED 31, the G-LED 32, and the B-LED 33. When the display device in accordance with the invention is used as an illumination device, the device may be controlled so that the W-LED 34 is turned on concurrently with the time when the R-LED 31, the G-LED 32, and the B-LED 33 are all turned on at a time.

Figure 6C:
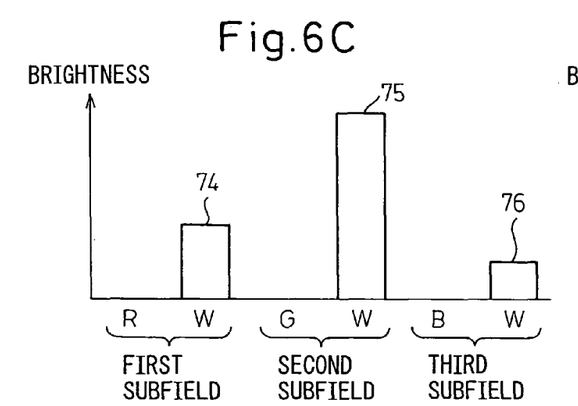
FIG. 6C is a view showing a monochrome display mode of the color display device 1 in accordance with the invention.

FIG. 6C shows an example of the distribution of the amount of each color light released from predetermined pixels of the liquid crystal panel 20 in the monochrome display mode of the color display device 1 in accordance with the present invention.

Specifically, in the case of FIG. 6C, the following actions are performed in the first subfield (see the state 306 in FIG. 3): turning on the W-LED 34 and adjusting predetermined pixels of the liquid crystal panel in transmittance, thereby to make the brightness of W 74. Further, the following actions are performed in the second subfield (see the state 306 in FIG. 3): turning on the W-LED 34 and adjusting predetermined pixels of the liquid crystal panel in transmittance, thereby to make the brightness of W 75. Still further, the following actions are performed in the third subfield (see the state 306 in FIG. 3): turning on the W-LED 34 and adjusting predetermined pixels of the liquid crystal panel in transmittance, thereby to make the brightness of W 76.

As stated above, in the case of FIG. 6C, control is exercised so that the brightness of each color in the case of FIG. 6A is replaced with the brightness achieved by lighting of only the W-LED 34. Therefore, the total brightness in the case of FIG. 6C is the same as that achieved in the case of FIG. 6A. In addition, the lighting of the W-LED 34 is controlled so that the brightness is made higher or the ON period is made longer in descending order of visibility of the colors (in the order of G, R and B in this embodiment). In this case, the display image in each of RGB subfields is made monochrome by the W-LED 34. However, as the amount of light emission of the W-LED 34 in each subfield is controlled in accordance with the descending order of visibility for G, R, and B as described above, a monochrome image which is suitable for the human eye is made a natural tone adapted to the visibility of the human eye by switching the R, G, and B subfields at a high speed. For example, when a color bar (with portions of black, blue, red, magenta, green, cyan, yellow, and white) used for adjustment of a display is displayed, the color bar can be visually recognized as a natural gray scale display which gradually becomes brighter in color from black to white. Further, as the W-LED 34 has a higher light emission efficiency in comparison to the other color LEDs, while the brightness of the same level is achieved, the power consumption can be suppressed to a lower level in the monochrome display mode. In addition, as for a conventional FSC color display device, in the case where an image of W color is desired, such image has been represented by mixing the R, G and B colors. Hence, display of a monochrome image has required all the light sources of the individual colors to emit light, and therefore remarkable reduction in power consumption has been hard to achieve. However, as the color display device 1 in accordance with the invention uses only W-LED 34 having a high light emission efficiency in the monochrome display mode, it is possible to reduce the power consumption remarkably.

Figure 6D:
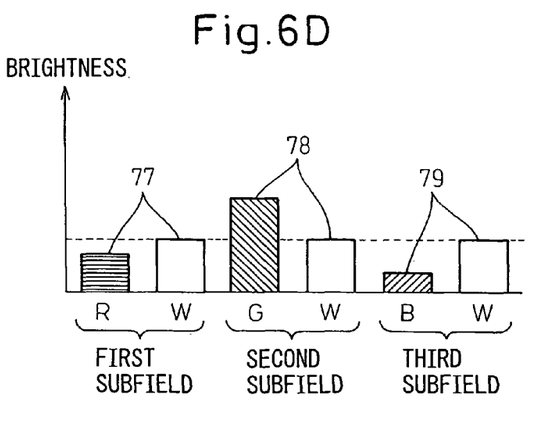
FIG. 6D is a view showing a color display mode of the color display device 1 in accordance with the invention.

FIG. 6D shows another example of the distribution of brightness of each color light released from predetermined pixels of the liquid crystal panel 20 in the color display mode of the color display device 1 in accordance with the invention.

The distribution shown in FIG. 6D differs from that shown in FIG. 6B in that the brightness of the W-LED 34 is made fixed in the first to third subfields in the case of FIG. 6D. Also in the case of FIG. 6D, to achieve the same brightness as that in the case of FIG. 6A, the brightness of the W-LED 34 which is turned on in the first to third subfields is set so as to be made a value resulting from the trisection of the total brightness of the W-LED 34 which is turned on in the first to third subfields as shown in FIG. 6B. Further, the brightness of the R-LED 31, G-LED 32 and B-LED 33 which are turned on in the first to third subfields is set in the same way as in the case of FIG. 6B. However, the brightness of the W-LED 34 in each subfield does not correspond to the brightness of each color, and therefore the visibility of the human eye does not agree with that in the case of FIG. 6A.

It is preferable to set the brightness of the W-LED 34 in each subfield individually in consideration of the visibility as in the case of FIG. 6B. However, the brightness of the W-LED 34 may be made unchanged in each subfield, whereby simple control without taking into account the visibility as in FIG. 6D may be performed. Hence, it becomes possible to reduce the cost because of its simple control and easy adjustment.

Figure 7:
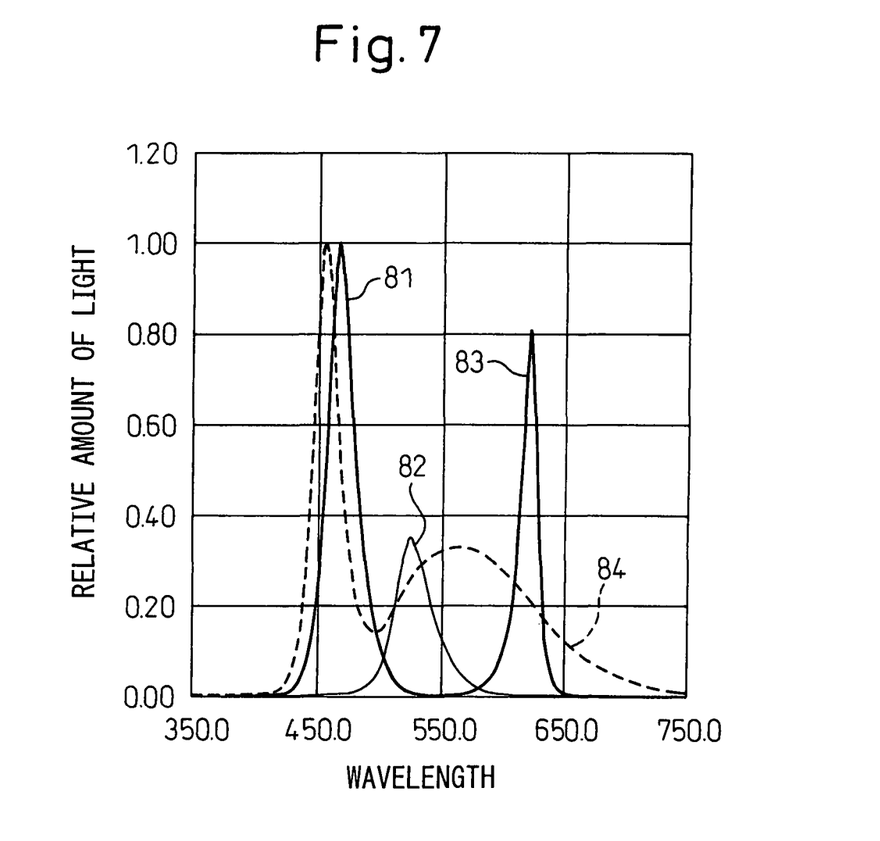
FIG. 7 is a graph showing emission wavelengths of an R-LED 31, a G-LED 32, a B-LED 33 and a W-LED 34 and normalized amounts of light.

FIG. 7 is a graph showing emission wavelengths and relative amounts of light of the R-LED 31, the G-LED 32, the B-LED 33, and the W-LED 34.

As shown in FIG. 7, peak wavelengths of the R-LED, G-LED, B-LED, and W-LED are 630, 540, 470, and 470 nm, respectively. In FIG. 7, relative amounts of light with respect to the wavelength distribution 83 of the R-LED and the wavelength distribution 82 of the G-LED show relative values when the amount of light at the peak wavelength of the wavelength distribution 81 of the B-LED is taken as 1.00. Further, the relative amount of light of the wavelength distribution 84 of the W-LED shows a relative value when the amount of light at the peak wavelength of the wavelength distribution 84 of the W-LED is taken as 1.00. Incidentally, the wavelength distribution of the W-LED is wider, and therefore the influence of its peak wavelength on the color resulting from composition of lights is small. Hence, although the W-LED has the peak wavelength, white color light can be obtained.

Figure 8:
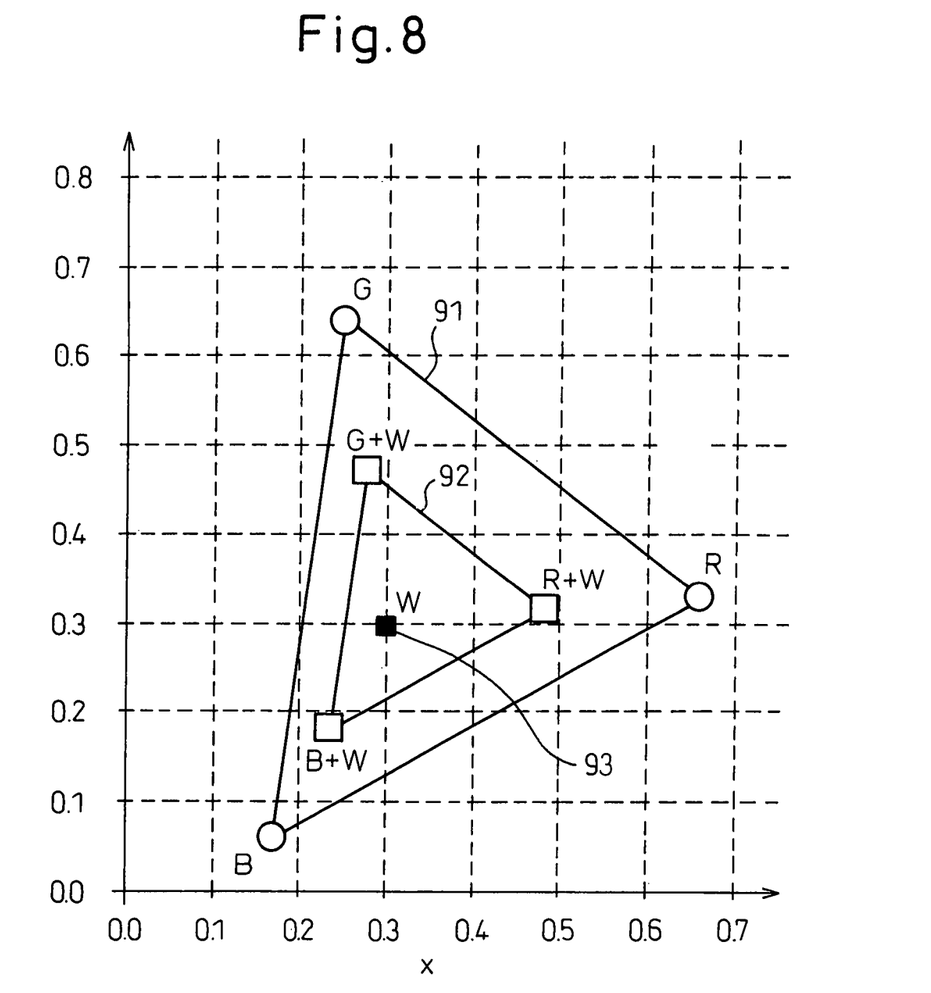
FIG. 8 is an xy chromaticity diagram showing examples of colors representable in the case of using an R-LED, a G-LED and a B-LED of three colors, and in the case of using combinations of R-LED and W-LED, G-LED and W-LED, and f-LED and W-LED.

FIG. 8 is an xy chromaticity diagram showing examples of colors which can be represented in the case of using LEDs of three color of R, G and B, and the cases of using LEDs of R and W colors, LEDs of G and W colors, and LEDs of B and W colors.

A triangle 91 shown in FIG. 8 shows an example of a range of the color which can be represented in the case of using only LEDs of R, G, and B colors. In other words, the color located in the triangle 91 can be represented by a combination of lights from the LEDs of the three colors. A triangle 92 shown in FIG. 8 shows an example of the range of the color which can be represented in the case of forcing a pair of the R-LED 31 and W-LED 34, a pair of the G-LED 32 and W-LED 34, and a pair of the B-LED 33 and W-LED 34 to emit light sequentially as shown in FIG. 6B. In other words, the color located in the triangle 92 can be represented by the R-LED 31, the G-LED 32, the B-LED 33, and the W-LED 34.

As shown in FIG. 8, in the case where the W-LED 34 is turned on concurrently with the time when the R-LED 31, the G-LED 32, and the B-LED 33 are turned on, white color is mixed with each color, and therefore the range of the representable color has a tendency to be narrowed. For example, when the percentage of light emission by the W-LED 34 in each field is increased, the range of the representable color is made smaller accordingly. Therefore, when only the W-LED 34 is made to emit light, the resultant image ends up as a monochrome image (see a point 93 in FIG. 8). However, in that case the effect of minimizing the power consumption can be attained, as the W-LED 34 is the highest in the light emission efficiency. An FSC color display device has a feature that its display color range is wide because it incorporates LEDs of R, G, and B colors. However, with an FSC color display device, a primary color of R, G or B may appear strongly, resulting in an artificial image. In contrast, even in such case, the color display device in accordance with the invention can ensure sufficient brightness, and suppress the power consumption, and it has the effect of providing almost natural display colors. In addition, even a color display device does not need to display a color image at all times. A monochrome display may suffice in the following cases, for example. The first is the case where it is desired to display only a character so that power consumption is minimized. The second is the case where it is desired to display in monochrome for a long period of time, for example. In such cases, the effect of low power consumption is remarkable in the monochrome display mode of the color display device 1 in accordance with the invention.

Figure 9:
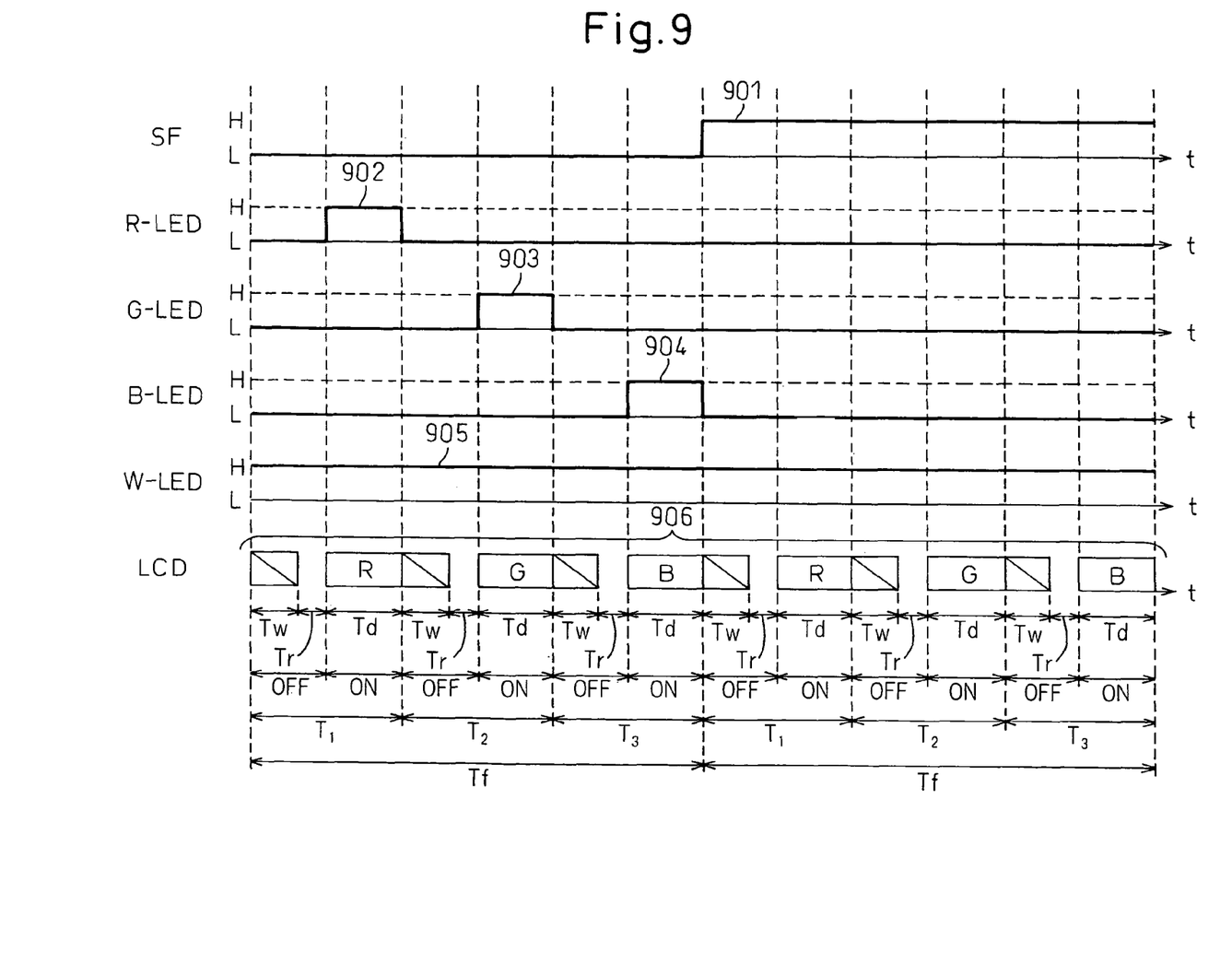
FIG. 9 is a drawing showing another example of the group of timing charts for the color display device 1 in accordance with the present invention.

FIG. 9 is a drawing showing another example of the group of timing charts for the color display device 1 in accordance with the present invention.

An SF signal 901 (i.e. a signal for switching between color display and monochrome display) is shown in FIG. 9; "H" level represents the monochrome display mode, and "L" level represents the color display mode. Also, in the drawing are shown a lighting control signal 902 of the R-LED 31, a lighting control signal 903 of the G-LED 32, a lighting control signal 904 of the B-LED 33, and a lighting control signal 905 of the W-LED 34. As for each lighting control signal, "H" level represents a lighting mode of the corresponding color LED, and "L" level represents an unlit mode thereof.

Also, in FIG. 9 are shown control states 906 of the liquid crystal panel 20 including a writing period Tw, a response period Tr and an image display period Td.

As for the control in accordance with the timing chart shown in FIG. 9, the image display control circuit 10 performs the control of each pixel of the liquid crystal panel 20 based on received image data, whereas the light source drive circuit 30 performs the control of the color LEDs 31 to 34 based on timing signals, etc. from the image display control circuit 10.

In the case of FIG. 9, one field (Period Tf) in the color display mode of the color display device 1 (SF is at L level) consists of a first subfield (Period $T_1$) in which the R-LED 31 is turned on, a second subfield (Period $T_2$) in which the G-LED 32 is turned on, and a third subfield (Period $T_3$) in which the B-LED 33 is turned on. Also, in the case of FIG. 9, the field frequency (1/Tf) is set to 100 Hz.

Lighting of the R-LED 31, G-LED 32 and B-LED 33 are controlled so that the ON and. OFF period ratio is controlled in synchronization with the image display period Td of the liquid crystal panel 20 (see the state 906 in FIG. 9), as shown by the lighting control signals 902 to 905 for the respective colors. While the R-LED 31, G-LED 32 and B-LED 33 are turned on with the same emission intensity, the lights emitted by the color LEDs are different in brightness. Therefore, the brightness of each color light is set to be just the same as the brightness of corresponding light of the R, G and B color lights as shown in FIG. 6B.

In the color display mode of the color display device 1 (SF is at L level), the W-LED 34 is controlled so that the W-LED stays ON over all the periods (see the lighting control signal 905 of W color). Further, in the color display mode of the color display device 1 shown in FIG. 9 (SF is at L level), the brightness of W color light from the W-LED 34 is set to be just the same as the brightness of W color light shown in FIG. 6D.

In each subfield, the W-LED and one of the R-LED, G-LED and B-LED are turned on. Therefore, an image in one color of R, G and B colors is displayed on the viewer side of the liquid crystal panel 20. However, as the subfield is switched rapidly exceeding the recognizable limitations of the human eye, a multicolor image resulting from integration of R, G and B color images is visually recognized by the human eye.

Also, in the monochrome display mode of the color display device 1 (SF is at H level), one field (Period Tf) consists of a first subfield (Period $T_1$), a second subfield (Period $T_2$), and a third subfield (Period $T_3$). The periods of the subfields in the monochrome display mode are the same as those in the color display mode. In the monochrome display mode, the R-LED 31, G-LED 32 and B-LED 33 are not turned on, and only the W-LED 34 is kept ON for all periods.

In each subfield the W-LED is on instead of the R-LED, G-LED, and B-LED, and therefore a monochrome image in white and black colors is displayed on the viewer side of the liquid crystal panel 20.

In contrast to the case shown by FIG. 3, in accordance to the timing chart shown in FIG. 9, the W-LED 34 is controlled so that it is kept ON over all the periods, in both the color display mode (SF is at L level) and the monochrome display mode (SF is at H level). If the R-LED 31, G-LED 32 and B-LED 33 are turned on in the periods (Tw and Tr), in which the transmittance of the pixel of the liquid crystal panel 20 is changed, color mixture is caused, and the amount of light of each color cannot be appropriately controlled. Therefore, the R-LED 31, G-LED 32 and B-LED 33 need to be turned on in synchronization with the image display periods Td of the liquid crystal panel 20.

In contrast, the light from the W-LED 34 has a white color, and the light of W color dilutes the color of color mixture. As a result, a user will not be concerned about the color mixture. Therefore, there is an effect that even when the W-LED is turned on in the periods (Tw and Tr), in which the transmittance of the pixel of the liquid crystal panel 20 is changed, the action does not matter absolutely. Further, even in such periods, the liquid crystal panel 20 allows light to pass therethrough to some extent, and therefore it is possible to increase the amount of light of a whole display. Hence, power consumption can be suppressed to a lower level in comparison to the case where the ON and OFF actions of the W-LED 34 are repeated as in the case of FIG. 3, or can be made as much as the power consumption in the case of FIG. 3 by: previously setting the amounts of light of the color LEDs to values lower than those in the case of FIG. 3; and keeping the W-LED 34 ON successively in consideration of the amount of W-color light emitted during the period of one field (Tf) when the W-LED 34 is kept ON. In addition, there is also an advantage that continuously keeping the W-LED 34 ON at all times simplifies the control accordingly.

In FIGS. 3 and 9, the lighting condition of the W-LED 34 is represented only by "H" and "L", "ON" and "OFF", or "lighting" and "unlit". However, when the W-LED 34 is turn on, the W-LED is driven and controlled so as to emit light with brightnesses corresponding to the R-LED 31, G-LED 32 and B-LED 33 as shown in FIG. 6B, FIG. 6C, or FIG. 6D actually.

Figure 10:
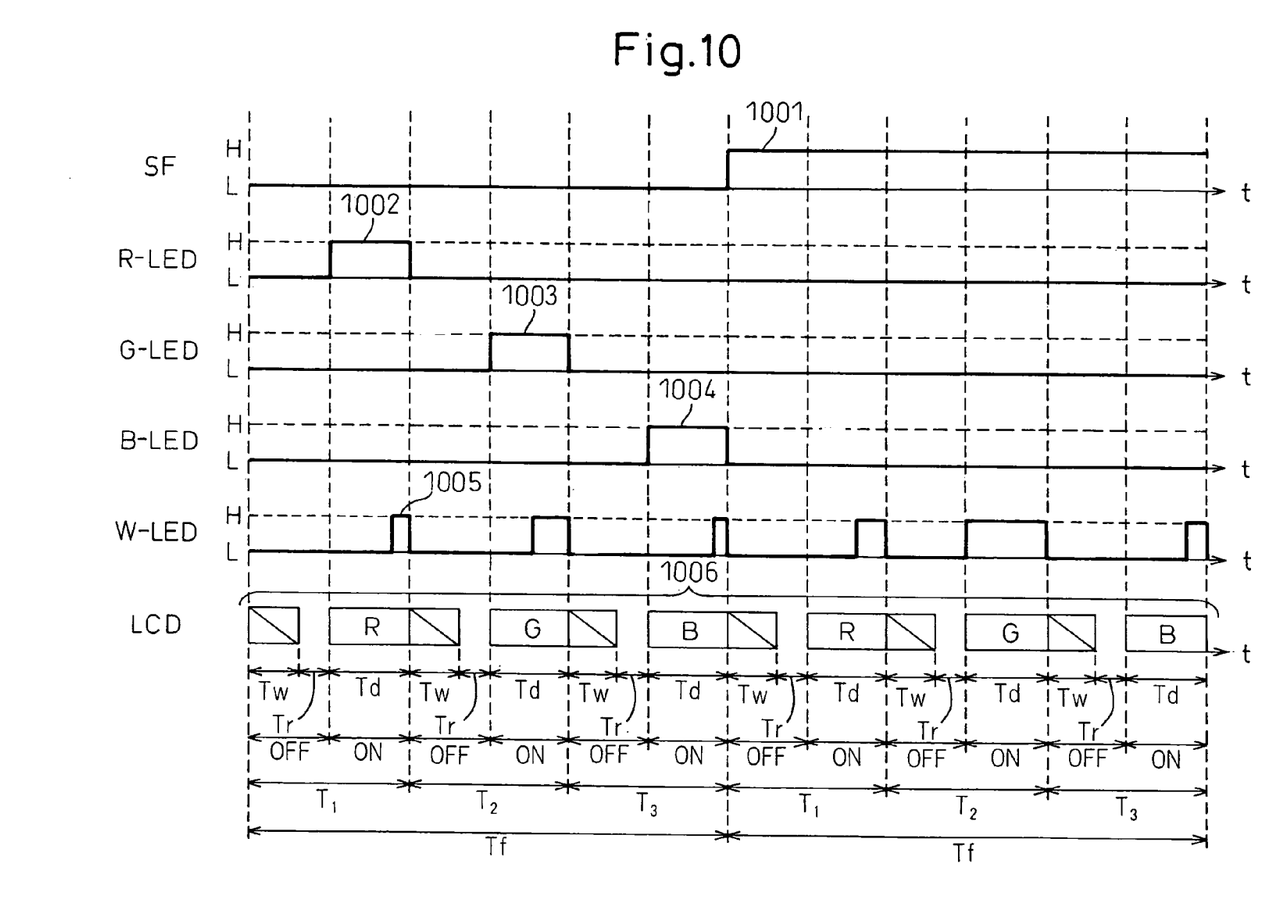
FIG. 10 is a drawing showing another example of the group of timing charts for the color display device 1 in accordance with the present invention.

FIG. 10 is a drawing showing another example of the group of timing charts for the color display device 1 in accordance with the present invention.

An SF signal 1001 (i.e. a signal for switching between color display and monochrome display) is shown in FIG. 10; "H" level represents the monochrome display mode, and "L" level represents the color display mode. Also, in FIG. 10 are shown a lighting control signal 1002 of the R-LED 31, a lighting control signal 1003 of the G-LED 32, a lighting control signal 1004 of the B-LED 33, and a lighting control signal 1005 of the W-LED 34. As for each lighting control signal, "H" level represents a lighting mode of the corresponding color LED, and "L" level represents an unlit mode thereof.

Further, in FIG. 10 are shown control states 1006 of the liquid crystal panel 20 including a writing period Tw, a response period Tr and an image display period Td.

As for the control in accordance with the timing chart shown in FIG. 10, the image display control circuit 10 performs the control of each pixel of the liquid crystal panel 20 based on the received image data, whereas the light source drive circuit 30 performs the control of the color LEDs 31 to 34 based on a timing signal, etc. from the image display control circuit 10.

In the case of FIG. 10, one field (Period Tf) in the color display mode of the color display device 1 (SF is at L level) consists of a first subfield (Period $T_1$) in which the R-LED 31 is turned on, a second subfield (Period $T_2$) in which the G-LED 32 is turned on, and a third subfield (Period $T_3$) in which the B-LED 33 is turned on. Also, in the case of FIG. 10, the field frequency (1/Tf) is set to 100 Hz.

Lighting of the R-LED 31, G-LED 32 and B-LED 33 are controlled so that the ON period vs. OFF period ratio is controlled in synchronization with the image display period Td of the liquid crystal panel 20 (see the state 1006 in FIG. 10), as shown by the lighting control signals 1002 to 1005. While the R-LED 31, G-LED 32 and B-LED 33 ate turned on with the same emission energy, the lights emitted by the color LEDs are different in brightness. Therefore, the brightness of each color light is set to be just the same as the brightness of corresponding light of the R, G and B color lights as shown in FIG. 6B.

In the color display mode of the color display device 1 (SF is at L level), the W-LED 34 is controlled so as to stay ON during only a predetermined period in the image display period Td of the liquid crystal panel 20 (see the lighting control signal 1005 for W color). The W-color light from the W-LED 34 is higher in brightness in comparison to the R, G and B color lights from the other LEDs. Hence, in the color display mode of the color display device 1 (SF is at L level), the W-LED 34 is turned on with the timing as shown by the lighting control signal 1005 for W color, and the brightness in each subfield is set to be just the same as the brightness of W-color light as shown in FIG. 6B.

In each subfield, the W-LED and one of the R-LED, G-LED and B-LED are turned on. Therefore, an image in one color of R, G and B colors is displayed on the viewer side of the liquid crystal panel 20. However, as the subfield is switched rapidly exceeding the recognizable limitations of the human eye, a multicolor image resulting from integration of R, G and B color images is visually recognized by the human eye.

Also, in the monochrome display mode of the color display device 1 (SF is at H level), one field (Period Tf) consists of: a first subfield (Period $T_1$); a second subfield (Period $T_2$); and a third subfield (Period $T_3$). The periods of the subfields in the monochrome display mode are the same as those in the color display mode. In the monochrome display mode, the R-LED 31, G-LED 32 and B-LED 33 are not turned on, and the W-LED 34 is controlled so as to stay ON during only a predetermined period in the image display period Td of the liquid crystal panel 20 (see the lighting control signal 1005 for W color). The W-color light from the W-LED 34 is higher in brightness in comparison to the R, G and B color lights from the other LEDs. Hence, in the monochrome display mode of the color display device 1 (SF is at H level), the W-LED 34 is turned on with the timing as shown by the lighting control signal 1005 for W color, and the brightness in each subfield is set to be just the same as the brightness of W-color light as shown in FIG. 6c.

In the example of FIG. 10, the ON period of the W-LED 34 in each subfield in the monochrome display mode of the color display device 1 (SF is at H level) is set to be approximately double the ON period of the W-LED 34 in each subfield in the color display mode of the color display device 1 (SF is at L level) (see the lighting control signal 1005 for W color).

In each subfield the W-LED goes on instead of the R-LED, G-LED, and B-LED, and therefore a monochrome image in white and black colors is displayed on the viewer side of the liquid crystal panel 20.

That is, in the example of FIG. 10, switching from the color display mode to the monochrome display mode is performed fitting to the visibility. Therefore, even when switching from the color display mode to the monochrome display mode is performed, a monochrome image of a gray scale having substantially the same color balance as that in a color display image can be obtained.

What is claimed is:

1. A color display device employing a field sequential color (FSC) system, comprising:
    a liquid crystal panel;
    an R-color light source for emitting red light;
    a G-color light source for emitting green light;
    a B-color light source for emitting blue light;
    a W-color light source for emitting white light;
    a light guiding means for illuminating the liquid crystal panel with light emitted by the R-color, G-color, B-color, and W-color light sources; and
    a light source controller for controlling the R-color, G-color, B-color, and W-color light sources to:
        display a color image by sequentially activating the R-color, G-color, and B-color light sources to emit light in respective subfields in a predetermined cycle, each of the subfields lasting for a predetermined duration, and
        display a monochrome image by activating the W-color light source to emit light in subfields corresponding to subfields of the predetermined cycle,
        wherein the light source controller controls the W-color light source so that:
            an apparent brightness of white light emission during a subfield corresponding to the R-color subfield is equal to the apparent brightness of the R-color light emitted during the R-color subfield;
            an apparent brightness of white light emission during a subfield corresponding to the G-color subfield is equal to the apparent brightness of the G-color light emitted during the G-color subfield; and
            an apparent brightness of white light emission during a subfield corresponding to the B-color subfield is equal to the apparent brightness of the B-color light emitted during the B-color subfield.

2. The color display device according to claim 1, wherein the light source controller controls the R-color, G-color, B-color, and W-color light sources to display the monochrome image by stopping the R-color, and B-color light sources, and emitting light from only the W-color light source.

3. The color display device according to claim 2, further comprising a receiver for receiving a signal for switching between a first mode for displaying the color image and a second mode for displaying the monochrome image.

4. The color display device according to claim 1, wherein the light source controller controls a ratio between an ON period of the R-color, G-color, B-color, and W-color light sources and an OFF period of the R-color, G-color, B-color, and W-color light sources.

\* \* \* \* \*